United States Patent
Martin et al.

(10) Patent No.: US 12,248,354 B2
(45) Date of Patent: Mar. 11, 2025

(54) AUTONOMOUS POWER MANAGEMENT FOR SUSTAINABLE STORAGE

(71) Applicant: Dell Products L.P., Hopkinton, MA (US)

(72) Inventors: Owen Martin, Hopedale, MA (US); Philippe Armangau, Kalispell, MT (US); Vasudevan Subramanian, Chapel Hill, NC (US)

(73) Assignee: Dell Products L.P., Hopkinton, MA (US)

( * ) Notice: Subject to any disclaimer, the term of this patent is extended or adjusted under 35 U.S.C. 154(b) by 89 days.

(21) Appl. No.: 18/347,632

(22) Filed: Jul. 6, 2023

(65) Prior Publication Data

US 2025/0013283 A1 Jan. 9, 2025

(51) Int. Cl.
G06F 1/32 (2019.01)
G06F 1/3234 (2019.01)
G06F 1/329 (2019.01)
G06F 1/3296 (2019.01)
G06F 1/3203 (2019.01)

(52) U.S. Cl.
CPC ............ *G06F 1/3275* (2013.01); *G06F 1/329* (2013.01); *G06F 1/3296* (2013.01); *G06F 1/3203* (2013.01)

(58) Field of Classification Search
CPC ....... G06F 1/3275; G06F 1/329; G06F 1/3296
USPC .......................................................... 713/320
See application file for complete search history.

(56) References Cited

U.S. PATENT DOCUMENTS

| | | | | |
|---|---|---|---|---|
| 9,575,542 | B2* | 2/2017 | Yoon | G06F 1/3275 |
| 11,532,943 | B1* | 12/2022 | Zauli | H02J 3/32 |
| 11,693,376 | B1* | 7/2023 | Mantooth | H02J 3/388 |
| | | | | 703/18 |
| 2009/0094473 | A1* | 4/2009 | Mizutani | G06F 1/3203 |
| | | | | 713/340 |
| 2009/0206797 | A1* | 8/2009 | Chueh | H02J 7/0071 |
| | | | | 320/150 |
| 2009/0299537 | A1* | 12/2009 | Rea | G06Q 30/06 |
| | | | | 700/286 |
| 2011/0173474 | A1* | 7/2011 | Salsbery | G06F 1/3203 |
| | | | | 713/323 |
| 2011/0213994 | A1* | 9/2011 | Thereska | G06F 16/1844 |
| | | | | 713/320 |
| 2012/0109392 | A1* | 5/2012 | Hanks | H02J 3/008 |
| | | | | 700/291 |

(Continued)

*Primary Examiner* — Volvick Derose
(74) *Attorney, Agent, or Firm* — Anderson Gorecki LLP

(57) ABSTRACT

A power controller for a data storage system automatically selects different power modes based on changing forecasts of availability of renewable energy. The power modes indicate settings for each of a plurality of hardware resources, such as processors, fans, memory, and drives. At times when the storage system can operate at less than the maximum level of performance in terms of IO latency or IOPS, power consumption of one or more of the hardware resources is reduced to a degree corresponding to availability of renewable energy. For example, the hardware resources may be operated in a relatively higher power mode when renewable energy is available than when renewable energy is unavailable. The storage system may be configured to automatically implement a low power mode when power from all sources is in limited supply, e.g., during a brownout.

20 Claims, 7 Drawing Sheets

(56) References Cited

U.S. PATENT DOCUMENTS

| | | | | |
|---|---|---|---|---|
| 2012/0274285 A1* | 11/2012 | Chawla | ............. | H01M 10/44 |
| | | | | 320/127 |
| 2012/0303990 A1* | 11/2012 | Nanda | ............. | G06F 1/3228 |
| | | | | 713/320 |
| 2012/0324245 A1* | 12/2012 | Sinha | ............. | G06F 1/26 |
| | | | | 713/300 |
| 2013/0169046 A1* | 7/2013 | Shin | ............. | H02J 9/00 |
| | | | | 307/66 |
| 2013/0313902 A1* | 11/2013 | Sako | ............. | H02J 9/06 |
| | | | | 307/23 |
| 2015/0073608 A1* | 3/2015 | Ippolito | ............. | G05F 1/67 |
| | | | | 700/286 |
| 2019/0220077 A1* | 7/2019 | Tuan | ............. | H02J 13/00 |
| 2020/0266628 A1* | 8/2020 | Kato | ............. | H02J 3/004 |
| 2021/0288493 A1* | 9/2021 | Prasad | ............. | H02J 3/003 |
| 2021/0349619 A1* | 11/2021 | Crowley | ............. | G06F 9/451 |
| 2022/0066530 A1* | 3/2022 | Nakamura | ............. | G06F 1/329 |
| 2022/0129057 A1* | 4/2022 | Tsai | ............. | G06F 1/3212 |
| 2022/0140644 A1* | 5/2022 | Dent | ............. | H02J 9/061 |
| | | | | 307/77 |
| 2023/0012079 A1* | 1/2023 | Kokai | ............. | H02J 3/24 |
| 2023/0139514 A1* | 5/2023 | Tennant | ............. | H02J 3/32 |
| | | | | 700/291 |
| 2023/0155482 A1* | 5/2023 | Dent | ............. | H02M 1/32 |
| | | | | 307/77 |
| 2023/0205301 A1* | 6/2023 | Duenas | ............. | G06F 1/3234 |
| | | | | 713/300 |
| 2023/0338892 A1* | 10/2023 | Vollmer | ............. | C02F 1/68 |
| 2023/0367278 A1* | 11/2023 | Nakano | ............. | G06Q 10/08 |
| 2024/0012459 A1* | 1/2024 | Guim Bernat | ............. | G06Q 50/50 |
| 2024/0077058 A1* | 3/2024 | Ratti | ............. | F03D 7/026 |

* cited by examiner

| Power State | Maximum Power (MP) | Entry Latency (ENTLAT) | Exit Latency (EXLAT) | Relative Read Throughput (RRT) | Relative Read Latency (RRL) | Relative Write Throughput (RWT) | Relative Write Latency (RWL) |
|---|---|---|---|---|---|---|---|
| 0 | 25 W | 5 µs | 5 µs | 0 | 0 | 0 | 0 |
| 1 | 18 W | 5 µs | 7 µs | 0 | 0 | 1 | 0 |
| 2 | 18 W | 5 µs | 8 µs | 1 | 0 | 0 | 0 |
| 3 | 15 W | 20 µs | 15 µs | 2 | 0 | 2 | 0 |
| 4 | 10 W | 20 µs | 30 µs | 1 | 1 | 3 | 0 |
| 5 | 8 W | 50 µs | 50 µs | 2 | 2 | 4 | 0 |
| 6 | 5 W | 20 µs | 5,000 µs | 4 | 3 | 5 | 1 |

AUTONOMOUS POWER MANAGEMENT FOR SUSTAINABLE STORAGE

TECHNICAL FIELD

The subject matter of this disclosure is generally related to data storage systems.

BACKGROUND

Data storage systems can be used by organizations to maintain data for instances of host applications that run on host servers in a cluster. Examples of such storage systems may include, but are not limited to, storage arrays, storage area networks (SANs), and network-attached storage (NAS). Examples of the host applications may include, but are not limited to, organization-level software for email, accounting, manufacturing, inventory control, and a wide variety of other business processes. The host application instances send input-output (IO) commands to the storage system to access the data. Because such storage systems can include extensive processing, memory, and storage resources, a significant amount of electrical power is consumed by those resources even when the storage system is not servicing high IO traffic loads. In a data center environment where clusters of servers are co-located with multiple storage systems, a significant amount of additional electrical power can be consumed by cooling systems to maintain those resources within operating temperature limits.

SUMMARY

A method in accordance with some embodiments comprises:

An apparatus in accordance with some embodiments comprises:

In accordance with some embodiments, a non-transitory computer-readable storage medium stores instructions that when executed by a computer perform a method comprising:

This summary is not intended to limit the scope of the claims or the disclosure. All examples, embodiments, aspects, implementations, and features can be combined in any technically possible way. Method and process steps may be performed in any order.

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features such as, for example, and without limitation, tangible features. The term "physical" refers to tangible features that possibly include, but are not limited to, electronic hardware. For example, multiple virtual computers could operate simultaneously on one physical computer. The term "logic," if used, refers to special purpose physical circuit elements, firmware, software, computer instructions that are stored on a non-transitory computer-readable medium and implemented by multi-purpose tangible processors, and any combinations thereof. Embodiments are described in the context of a data storage system that includes host servers and storage arrays. Such embodiments are not limiting.

Some embodiments, aspects, features, and implementations include machines such as computers, electronic components, optical components, and processes such as computer-implemented procedures and steps. The computer-implemented procedures and steps are stored as computer-executable instructions on a non-transitory computer-readable medium. The computer-executable instructions may be executed on a variety of tangible processor devices, i.e., physical hardware. For practical reasons, not every step, device, and component that may be part of a computer or data storage system is described herein. Those steps, devices, and components are part of the knowledge generally available to those of ordinary skill in the art. The corresponding systems, apparatus, and methods are therefore enabled and within the scope of the disclosure.

Figure 1:
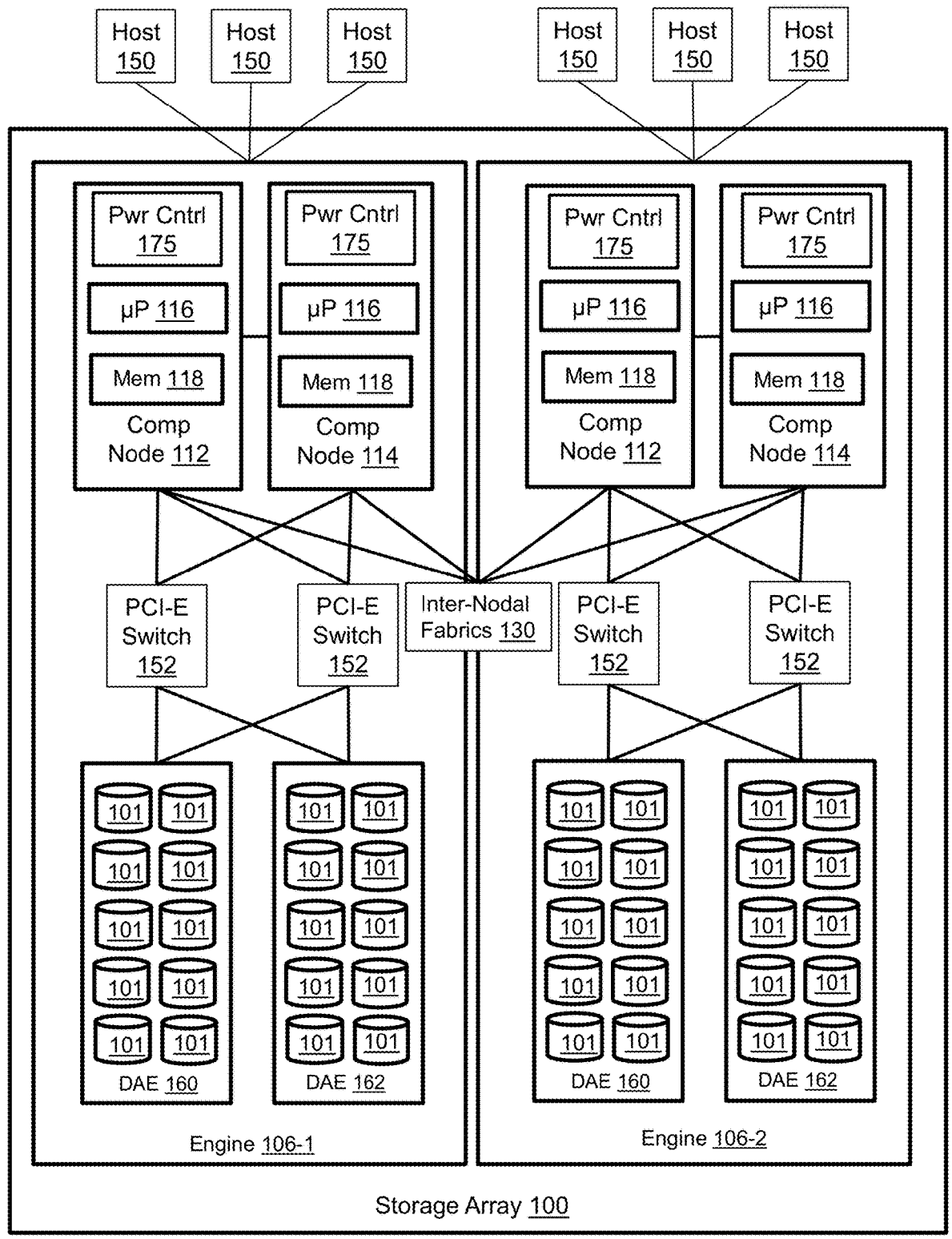
FIG. 1 illustrates a storage system with autonomous power control for management of consumption of renewable energy.

FIG. 1 illustrates a storage system with autonomous power control for management of consumption of renewable energy. The specifically illustrated storage system is a storage array, but other types of storage systems could be used with autonomous power management for consumption of renewable energy. Storage array 100 is shown with two engines 106-1, 106-2, but might include any number of engines. Each engine includes disk array enclosures (DAEs) 160, 162 and a pair of peripheral component interconnect express (PCI-E) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board (PCB) and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array using direct memory access. Each compute node includes one or more adapters and ports for communicating with host servers 150 to service IOs from the host servers. Each compute node also includes one or more adapters for communicating with other compute nodes via redundant inter-nodal channel-based InfiniBand fabrics 130. Power control subsystems 175 manage the processing, memory, and storage resources to help achieve sustainable power usage goals such as using relatively more renewable energy and less non-renewable energy compared with unmanaged operation. The power control subsystems 175 may include one or more of software stored on the managed drives and memory, software running on the processors, hardware, firmware, and any combinations thereof.

Figure 2:
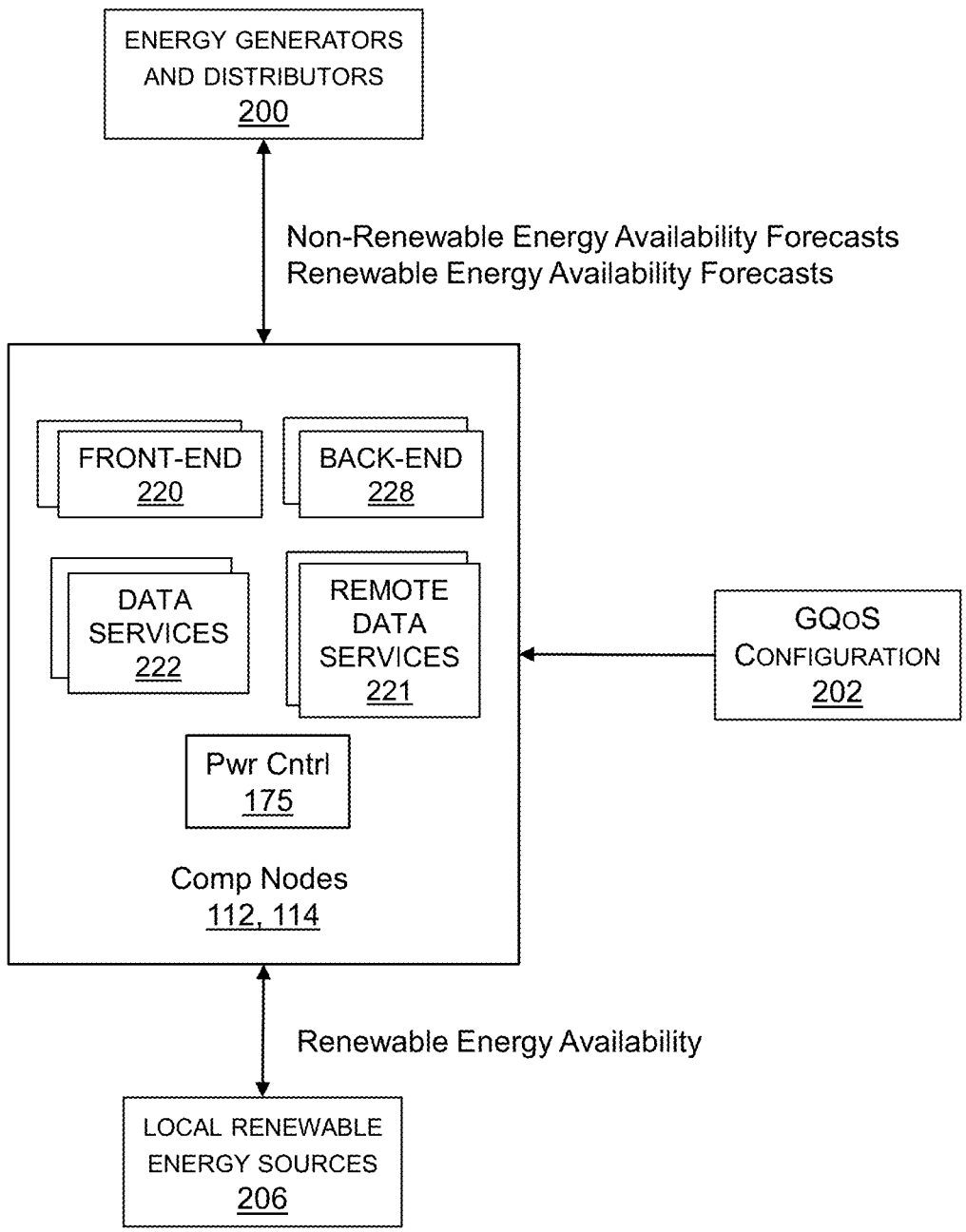
FIG. 2 illustrates indirect power consumption management of emulations based on a GQoS configuration and energy availability forecasts.

Referring to FIGS. 1 and 2, each compute node 112, 114 runs emulations for completing different storage-related tasks and functions. Front-end emulations 220 handle communications with the host servers 150. For example, front-end emulations receive IO commands from host servers and return data and write acknowledgements to the host servers. Each front-end emulation has exclusively allocated resources for servicing IOs from the host servers. The exclusively allocated resources include processor cores, volatile memory, and ports via which the hosts may access the storage array. Back-end emulations 228 handle communications with managed drives 101 in the DAEs 160, 162. Each back-end emulation has exclusively allocated resources for accessing the managed drives. The exclusively allocated resources include processor cores, volatile memory, and ports. Data services emulations 222 process IOs. For example, data services emulations maintain metadata that maps between logical block addresses of the storage objects to which IOs from the host applications are directed and the physical addresses on the managed drives. The data services emulations maintain the shared memory in which data is temporarily copied to service IOs. For example, Read IOs characterized as "read-miss" prompt a data services emulation to cause a back-end emulation to copy the data from the managed drives into the shared memory. The data services emulation then causes the front-end emulation to return the data to the host application. In the case of a "read-hit" in which the data is already in shared memory when the IO is received, the data is accessed from the shared memory without being copied from the managed drives by the back-end emulation in response to the IO. Write IOs prompt the data services emulations to copy the data into the shared memory, generate a write acknowledgement, and eventually prompt a back-end emulation to destage the data to the managed drives. Each data services emulation has exclusively allocated resources for servicing IOs from the host servers. The exclusively allocated resources include processor cores, volatile memory, and ports via which the hosts may access the storage array. Remote data services emulations 221 handle communications with other storage systems, e.g., other storage arrays for remote replication and remote snapshot creation. Each remote data services emulation has exclusively allocated resources for servicing IOs from the host servers. The exclusively allocated resources include processor cores, volatile memory, and ports via which the hosts may access the storage array. Each emulation includes a process with multiple worker threads.

Each power control subsystem 175 manages the emulations running locally on the same compute node via adjustment of task scheduling and management of the hardware resources described above. Power consumption management decisions are made based on information in a data structure containing a "green quality of service" (GQoS) configuration 202. The GQoS configuration defines multiple power consumption modes that are dynamically selected and implemented based on dynamically changing forecasted power availability and other variables. Each power control subsystem obtains forecasts of non-renewable energy availability and forecasts of renewable energy availability from energy generators and distributors 200. The forecasts may be obtained using a push, pull, or push/pull model and may include use of an API. Each power control subsystem also obtains renewable energy availability information from local renewable energy sources 206 that are not provided by the energy generators and distributors, e.g., a directly connected solar array or wind power farm. The information is used by the power control subsystem to forecast availability of renewable energy from local renewable energy sources that are not provided by the energy generators and distributors. The non-renewable energy availability forecasts indicate when power from the generators and distributors is expected to be in limited supply, e.g., brownouts or when the energy distribution grid is under strain due to extreme temperatures or natural disasters. The renewable energy availability forecasts, including forecasts for local sources and the generators and distributors, indicate when and how much renewable energy is expected to be available and/or unavailable, e.g., when solar arrays or wind farms are expected to be active and/or inactive and how much of their output is available for consumption by the storage system. The power control subsystem uses the forecasts to dynamically reconfigure storage system resources to increase reliance on renewable energy in a manner consistent with the GQoS configuration.

Figure 3:
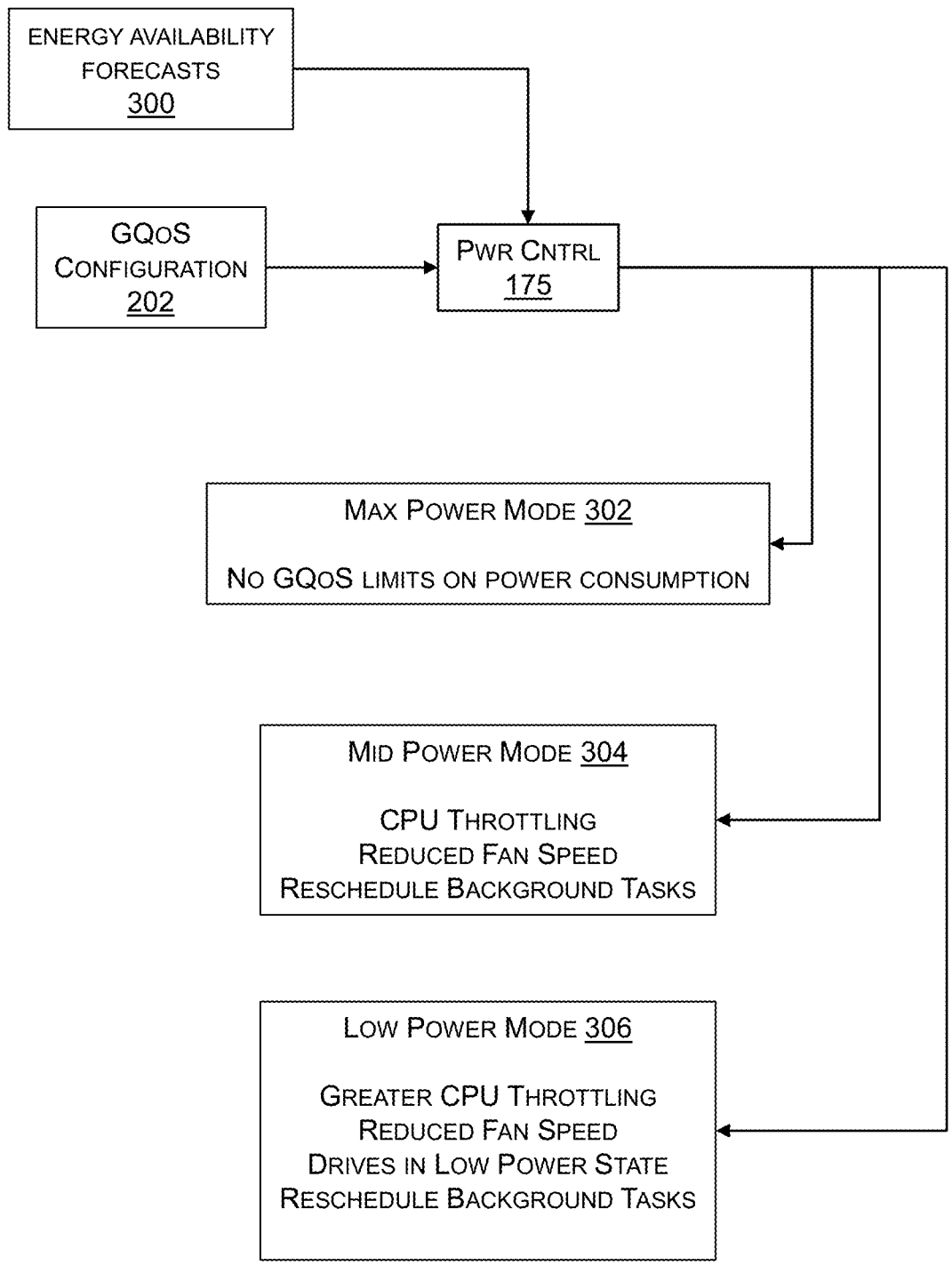
FIG. 3 illustrates power control mode selection.

FIG. 3 illustrates selection of power control modes. The illustrated example has three distinct power control modes, but any number of power control modes might be implemented. In a maximum power mode 302 there are no GQoS limits on power consumption by the storage system. There may be limits placed on power consumption by systems outside of GQoS unrelated to renewable energy, but such systems are beyond the scope of the present disclosure. In a middle power mode 304 the power control subsystem implements CPU throttling and reduces cooling fan speed. Some background tasks are rescheduled to be performed with renewable power if necessary. In a low power mode 306 there is further CPU throttling and reduced fan speed and the drives are placed in a lower power state. Further, background tasks are rescheduled to be performed with renewable power. CPU throttling may be implemented in different ways such as by reducing CPU clock speed or placing selected cores in a sleep or hibernation state. The degree to which CPUs are throttled and fan speed is reduced for each power mode is specified in the GQoS configuration 202. The GQoS configuration also indicates which of the power modes to select and implement based on all energy availability forecasts 300. For example, the GQoS configuration might indicate that the low power mode 306 is implemented when energy from all sources 300 is in limited supply and that the middle power mode 304 is implemented when renewable energy is available.

Figures 4A, 4B:
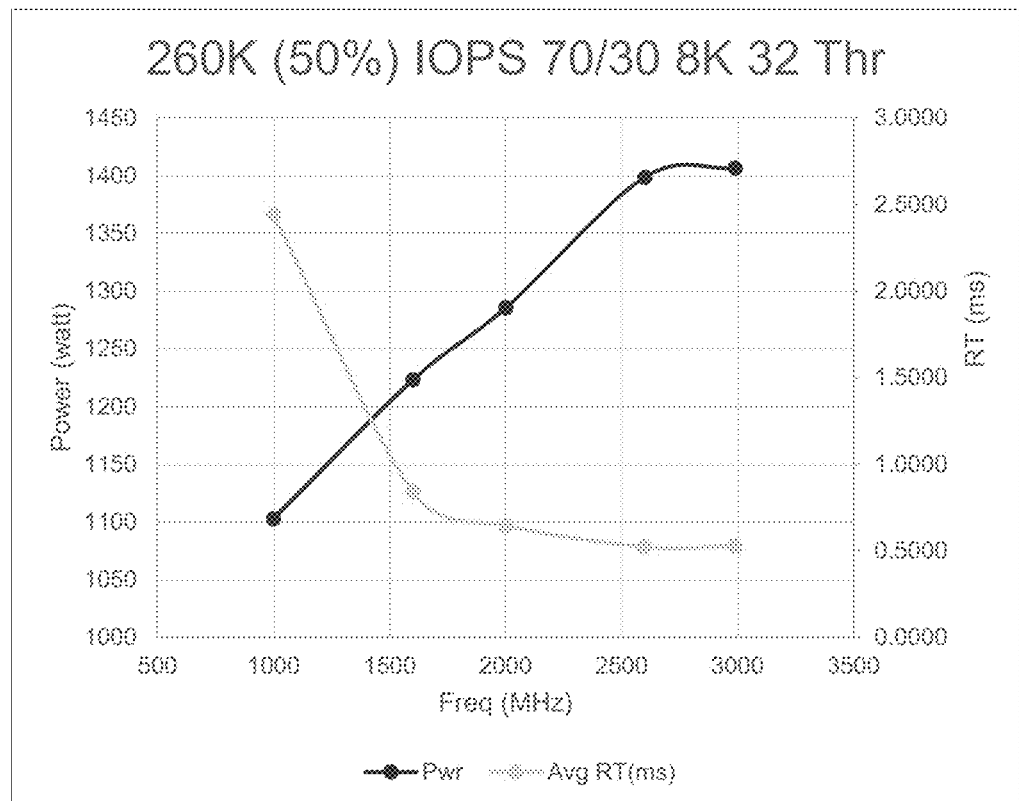
FIG. 4A illustrates power consumption versus IO latency for a given workload.
FIG. 4B illustrates drive power states.

FIG. 4A illustrates power consumption versus IO latency for a given IO workload. IO latency is an indication of the delay between receipt of an IO by the storage system and transmission of a response by the storage system to service the IO, e.g., data in the case of a read IO and an acknowledgment in the case of a write IO. There is an inverse, non-linear relationship between power consumption and IO latency such that storage system performance improves in terms of reduced IO latency by running components that consume more power, but with diminishing returns. In the illustrated example the storage system IO latency is reduced by significantly more per additional watt of power consumed from 1100 watts to 1225 watts than from 1225 watts to 1400 watts. Further, consumption above 1400 watts provides negligible reduction of IO latency. The GQoS configuration can be designed to manage power consumption based on such performance versus power consumption curves by matching power consumption in the middle power mode, for example, with the inflection of efficiency at 1225 watts.

FIG. 4B illustrates drive power states. There is an inverse, non-linear relationship between drive power state and drive performance in terms of entry latency, exit latency, relative read throughput, relative read latency, relative write throughput, and relative write latency. The GQoS configuration can be designed to manage drive power consumption based on such drive performance versus drive power consumption curves by using power state 5 for the middle power mode, for example, because power state 5 is associated with an inflection of efficiency.

Figure 5:
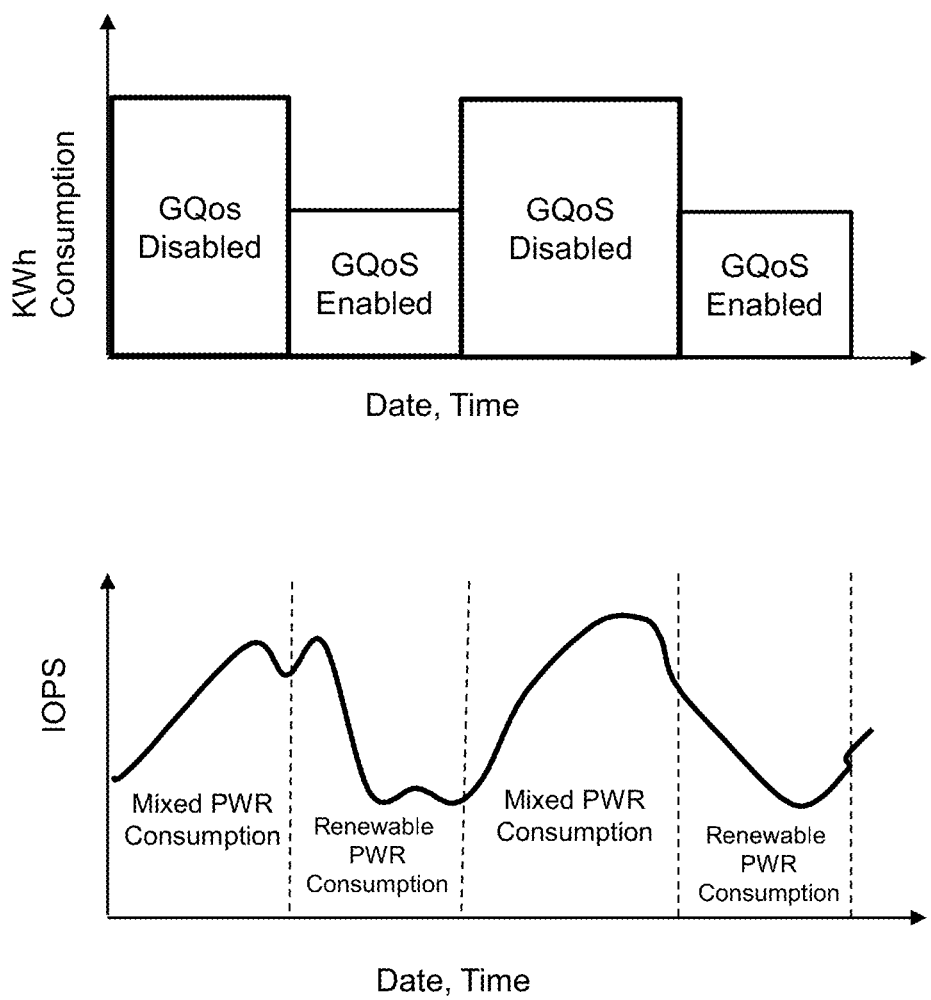
FIG. 5 illustrates enablement of GQoS power management based on date and time.

FIG. 5 illustrates enabling and disabling of GQoS power control based on date and time in order to achieve storage system performance objectives. The GQoS configuration indicates when it will be enabled and disabled in terms of date and time. For example, GQoS may be enabled during non-business hours such as evenings, weekends, and holidays to reduce power consumption and disabled during regular business hours to maximize performance in terms of IO latency or IOPS. When GQoS is disabled, the storage system consumes a mix of renewable and non-renewable power, as available, and achieves improved performance in terms of IO latency or IOPS at the expense of greater power consumption. When GQoS is enabled, the storage system increases reliance on renewable power to promote sustainable operation.

Figure 6:
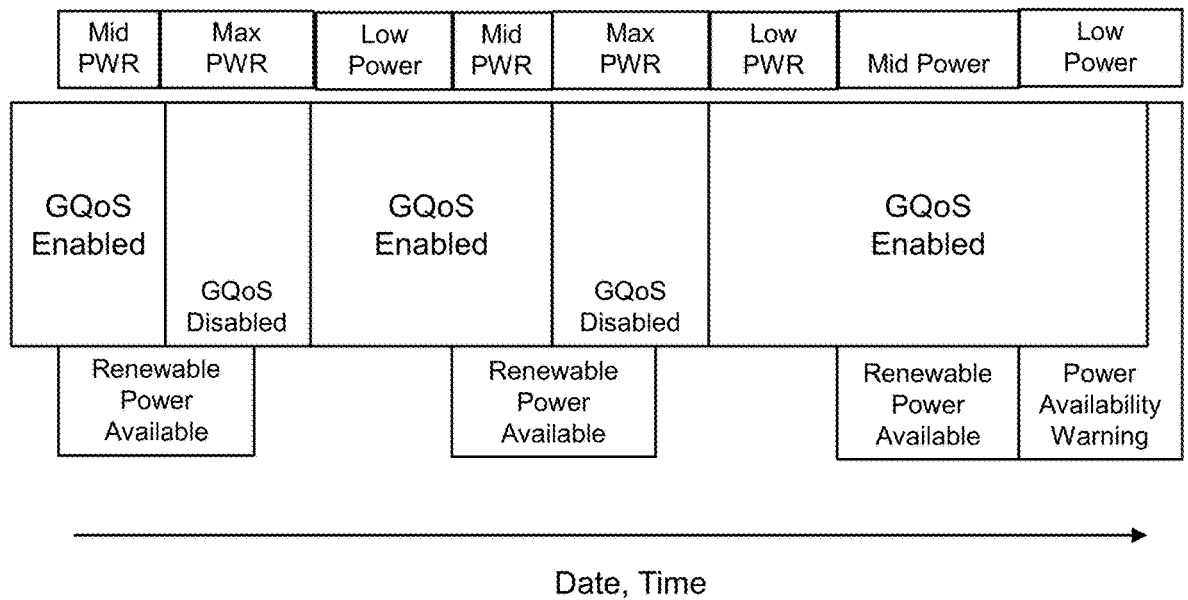
FIG. 6 illustrates selection of power control modes based on availability of renewable power and whether GQoS power management is enabled.

FIG. 6 illustrates power control mode selection based on availability of renewable power and whether GQoS is enabled. When GQoS is enabled and renewable power is available, the power control subsystems select and implement the middle power mode. When GQoS is disabled the power control subsystems select the maximum power mode regardless of whether renewable power is available. When GQoS is enabled and renewable power is unavailable, the power control subsystems select and implement the low power mode. When GQoS is enabled and there is a warning of limited availability of power from all sources, the power control subsystems select and implement the low power mode. When GQoS is disabled and there is a warning of limited availability of power from all sources the power control subsystems select and implement one of the power modes as defined by user preferences.

Figure 7:
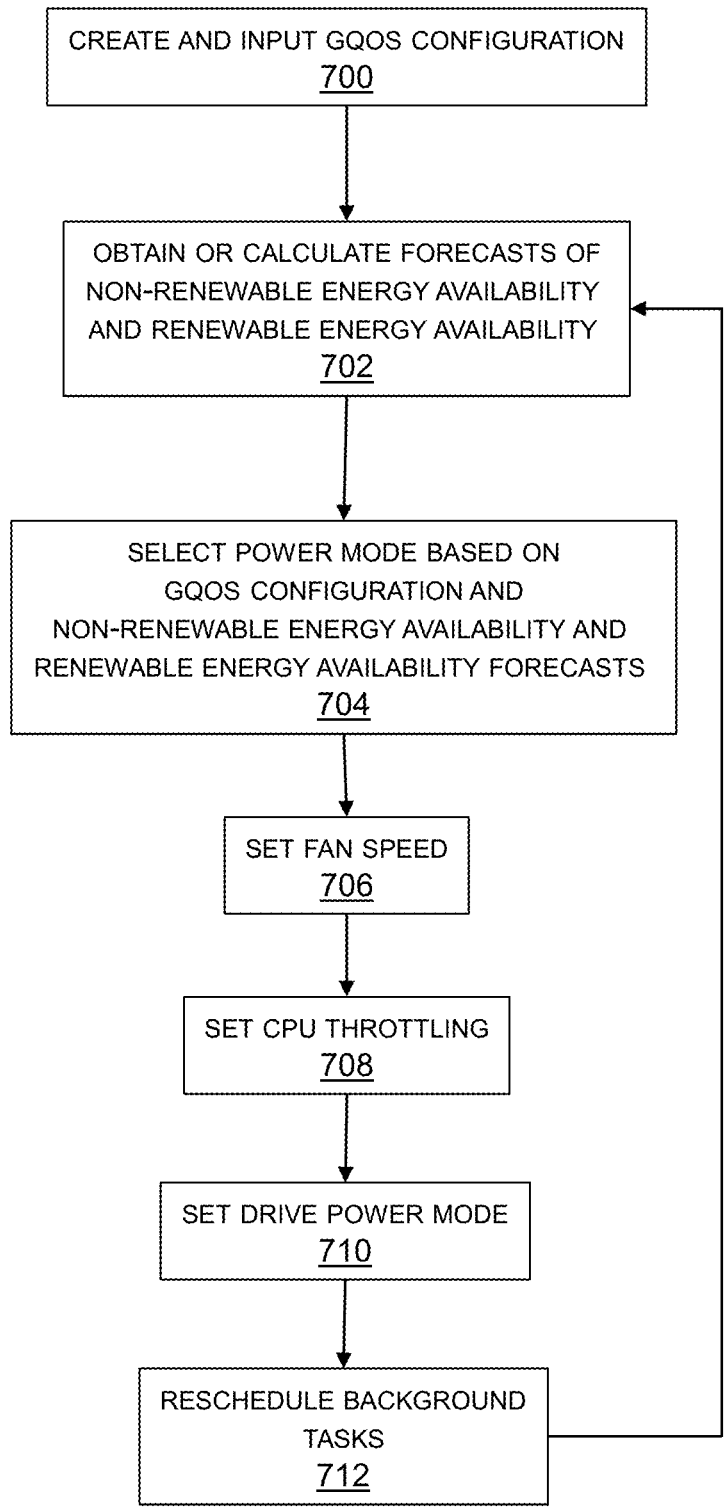
FIG. 7 illustrates a method for implementing autonomous power management for more sustainable storage.

FIG. 7 illustrates a method for implementing autonomous power management for sustainable storage. Step 700 is creating and inputting a GQoS configuration for a storage system. Within a data center, each storage system may have a separate and distinct GQoS configuration that differs from the GQoS configurations of other storage systems. As such, storage systems that support lower priority applications may be configured to be more reliant on renewable energy than storage systems that support higher priority applications. Step 702 is obtaining and/or calculating forecasts of non-renewable energy availability and renewable energy availability. For example, warnings of reduced availability of non-renewable energy may be pushed to the storage system from the generators and distributors. Forecasts of availability of renewable energy may be pulled from the generators and distributors by the storage system. The storage system may calculate forecasts of availability of renewable energy from local sources other than the generators and distributors. Step 704 is selecting a power mode based on the GQoS configuration and the forecasts of availability of non-renewable and renewable energy. The GQoS configuration defines the power consumption actions to be implemented in each mode and the conditions under which each mode is selected and implemented. Step 706 is setting fan speed based on the selected power mode. Step 708 is setting CPU throttling based on the selected power mode. Step 710 is setting drive power mode based on the selected power mode. Step 712 is rescheduling background tasks based on the selected power mode. The selected power mode may include only some or none of the power consumption reduction actions associated with steps 706 through 712. For example, if GQoS is disabled, then step 706 may be setting fan speed to full, step 708 may be disabling any CPU throttling, step 710 may include setting the drives to power state 0, and step 712 may include resumption of background tasks. Steps 702 through 712 are performed iteratively so the storage system dynamically implements different power modes in response to changes in availability of renewable and non-renewable energy.

Although advantages are not considered necessary to any embodiments, some embodiments may help decrease reliance on non-renewable energy. Moreover, decreased reliance on non-renewable energy may be accomplished without significantly degrading IO latency and IOPS performance of the storage system and the host applications that are supported by the storage system.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:
1. A method comprising:
    automatically selecting one of a plurality of power modes for a storage system based on a forecast of availability of renewable energy, where the power modes indicate settings for each of a plurality of hardware resources of the storage system; and
    automatically adjusting power consumption of at least one hardware resource of the storage system as indicated by the selected power mode.
2. The method of claim 1 further comprising selecting a different power mode of the plurality of power modes based on an updated forecast of availability of renewable energy.
3. The method of claim 2 further comprising the storage system obtaining forecasts of renewable energy availability and non-renewable energy availability from a power generator or distributor.
4. The method of claim 3 further comprising the storage system calculating forecasts of renewable energy availability from a local power source other than the power generator or distributor.
5. The method of claim 1 further comprising automatically adjusting usage of at least one hardware resource of the storage system by adjusting one or more of fan speed, processor clock rate, processor operational state, and drive power mode.
6. The method of claim 1 further comprising adjusting usage of at least one hardware resource of the storage system by rescheduling background tasks.

7. The method of claim 1 further comprising automatically reducing power consumption in response to an indication of limited availability of power from a power generator or distributor.

8. An apparatus comprising:
a storage system comprising at least one compute node configured to manage access to at least one non-volatile drive, the compute node comprising hardware resources including processors and memory; and
a power control subsystem adapted to automatically select one of a plurality of power modes for the storage system based on a forecast of availability of renewable energy, where the power modes indicate settings for each of a plurality of hardware resources of the storage system, and automatically adjust power consumption of at least one of the hardware resources as indicated by the selected power mode.

9. The apparatus of claim 8 further comprising the power control subsystem configured to select a different power mode of the plurality of power modes based on an updated forecast of availability of renewable energy.

10. The apparatus of claim 9 further comprising the power control subsystem configured to obtain forecasts of renewable energy availability and non-renewable energy availability from a power generator or distributor.

11. The apparatus of claim 10 further comprising the power control subsystem configured to calculate forecasts of renewable energy availability from a local power source other than the power generator or distributor.

12. The apparatus of claim 8 further comprising the power control subsystem configured to automatically adjust usage of at least one hardware resource of the storage system by adjusting one or more of fan speed, processor clock rate, processor operational state, and drive power mode.

13. The apparatus of claim 8 further comprising the power control subsystem configured to adjust usage of at least one hardware resource of the storage system by prompting rescheduling of background tasks.

14. The apparatus of claim 8 further comprising the power control subsystem configured to automatically reduce power consumption in response to an indication of limited availability of power from a power generator or distributor.

15. A non-transitory computer-readable storage medium storing instructions that when executed by a computer perform a method comprising:
automatically selecting one of a plurality of power modes for a storage system based on a forecast of availability of renewable energy, where the power modes indicate settings for each of a plurality of hardware resources of the storage system; and
automatically adjusting power consumption of at least one hardware resource of the storage system as indicated by the selected power mode.

16. The non-transitory computer-readable storage medium of claim 15 in which the method further comprises selecting a different power mode of the plurality of power modes based on an updated forecast of availability of renewable energy.

17. The non-transitory computer-readable storage medium of claim 16 in which the method further comprises the storage system obtaining forecasts of renewable energy availability and non-renewable energy availability from a power generator or distributor.

18. The non-transitory computer-readable storage medium of claim 17 in which the method further comprises the storage system calculating forecasts of renewable energy availability from a local power source other than the power generator or distributor.

19. The non-transitory computer-readable storage medium of claim 15 in which the method further comprises automatically adjusting usage of at least one hardware resource of the storage system by adjusting one or more of fan speed, processor clock rate, processor operational state, and drive power mode.

20. The non-transitory computer-readable storage medium of claim 15 in which the method further comprises adjusting usage of at least one hardware resource of the storage system by rescheduling background tasks.

\* \* \* \* \*